United States Patent [19]

Jonsson

[11] 4,074,772
[45] Feb. 21, 1978

[54] TORQUING TOOL CONTROL CIRCUIT

[75] Inventor: Gregg N. Jonsson, Batavia, Ill.

[73] Assignee: Thor Power Tool Company, Aurora, Ill.

[21] Appl. No.: 663,678

[22] Filed: Mar. 4, 1976

[51] Int. Cl.² .............................................. B23Q 5/00
[52] U.S. Cl. .................................... 173/12; 73/88 F; 73/139
[58] Field of Search .................. 73/88 F, 136 R, 139; 81/52.4 R; 91/59; 173/12; 307/119, 124; 318/434, 488; 235/151.11 R

[56] References Cited

U.S. PATENT DOCUMENTS

| 3,643,501 | 2/1972 | Pauley | 73/88 F UX |
| 3,825,912 | 7/1974 | Wiese et al. | 73/88 F |
| 3,919,563 | 11/1975 | Lautier et al. | 307/119 |
| 3,926,264 | 12/1975 | Bardwell et al. | 173/12 |
| 3,939,920 | 2/1976 | Hardiman et al. | 173/12 |
| 3,962,910 | 6/1976 | Spyridakis et al. | 73/139 X |
| 3,969,960 | 7/1976 | Pagano | 73/139 X |
| 3,973,434 | 8/1976 | Smith | 173/12 X |
| 3,975,954 | 8/1976 | Barnich | 73/139 |

Primary Examiner—Lawrence J. Staab

[57] ABSTRACT

The control circuit receives a signal from a torque measuring device provided on the tool and determines the proper shut off point for the tool. The circuit controls not only the tool shut off but also the rate of application of torque by employing a pulsing circuit. The circuit is capable of detecting the onset of yield and can accurately and repeatedly set a fastener at a desired point in the plastic region. The onset of yield is detected by differentiating torque with respect to time.

19 Claims, 5 Drawing Figures

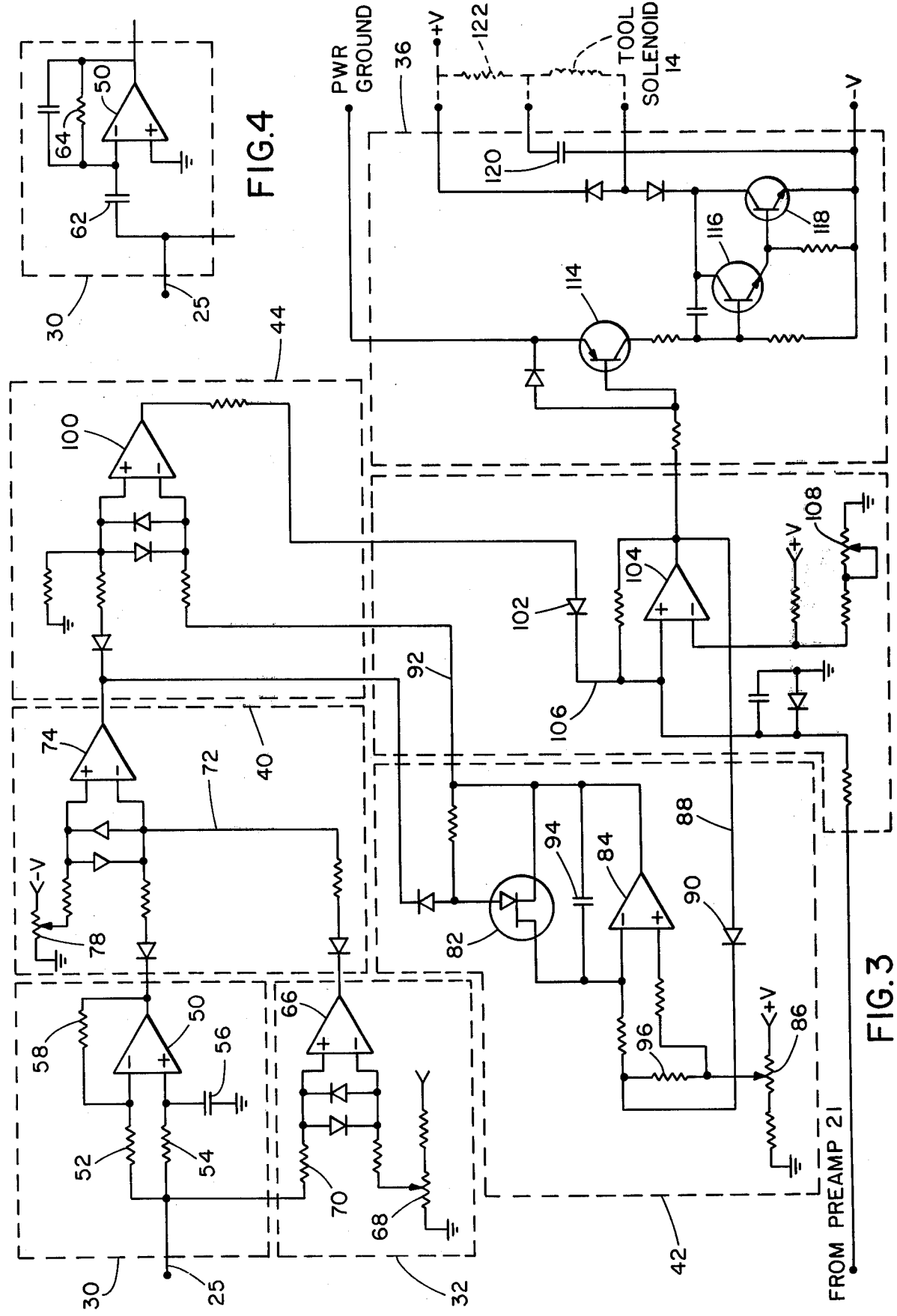

TORQUING TOOL CONTROL CIRCUIT

BACKGROUND OF THE INVENTION

This invention relates to control circuits for rotary tools. More specifically, it relates to circuits which control the operation of a torquing tool as, for example, a nut runner or similar device. These type of torquing tools may be electrically or pneumatically powered and are utilized for drawing a nut down upon a threaded bolt or similar torquing operations on other types of fasteners.

The devices, per se, have been in use for some period of time. Determining the operation period of the device for each fastener has long been a problem in order that maximum tightness and strength can be achieved. Accordingly, most tools include means for limiting the amount of torque which is developed by the tool so that the fastener tightened by the tool is not torqued to a point where it cracks or is significantly weakened. Prior techniques of controlling the shut off point of the device include the use of a slip clutch, a torque sensing device to compare developed torque against a preset maximum and similar arrangements.

Recently, it has been determined that maximum fatique resistance with minimum added stress can be developed on a fastener by tightening a nut onto a bolt to a point where the bolt (or other fastening device) first enters yield or slightly beyond depending upon the desired application. For a further discussion of this subject reference is made to the following article: "Preloading for Optimum Bolt Efficiency", R. J. Finkelston, August 1974, Assembly Engineering, pp. 24–28.

At present no device has been developed which can accurately detect the onset of yield and thereby control torque applied to a fastener during the operation of the nut runner or similar device. Examples of prior art devices which include torque control or torque sensing include U.S. Pat. Nos. 3,827,506 and 3,538,763. In both disclosures the fasteners are torqued to a preselected maximum torque without regard to the torque necessary to cause a given fastener to enter yield. Thus, sample to sample variations in the fasteners produce less than optimal results in that some fasteners are torqued into yield while others may not be or are over torqued wearing them.

One known method of determining the onset of yield is to measure the change in torque with respect to the angular position of the tool. While this is possible it has the distinct disadvantage that the tool must be mounted in a frame or other fixture so that the angular orientation of the tool does not shift and thereby uncalibrate the control circuit.

This drawback is overcome in the present invention in which the onset of yield is detected by measuring the change in torque with respect to time. This is possible because time is clearly related to the revolutions of a torquing tool if the tool has sufficient power to shear the bolt on which it is driving a fastener. Freeing the tool from a fixture is an important requirement if such tools are to be widely used in present day assembly operations.

It is accordingly an object of the present invention to provide a torquing tool control circuit which is capable of detecting the onset of yield in a fastener and shutting off the torquing tool at a selected point in the plastic region.

It is another object of the invention to provide a control circuit which will cyclically operate the torquing tool to prevent excessive torque rates as the fastener approaches the yield point.

It is another object of the invention to provide a control circuit for a torquing tool which can detect the onset of yield in a fastener without the use of angular encoders or the requirement of a fixturing device for the tool.

A further object of the invention is to provide a pneumatic nut running system in which a torquing tool is closely controlled to repeatedly achieve a desired torque in the elastic range of the fastener.

These and other objects of the invention will become apparent from the remaining portion of the specification.

BRIEF DESCRIPTION OF THE DRAWINGS

FIG. 3 is a detailed schematic of the control circuit.

FIG. 4 is a detailed schematic of a modified detector for use with a control circuit according to the invention.

DETAILED DESCRIPTION

Figure 1:
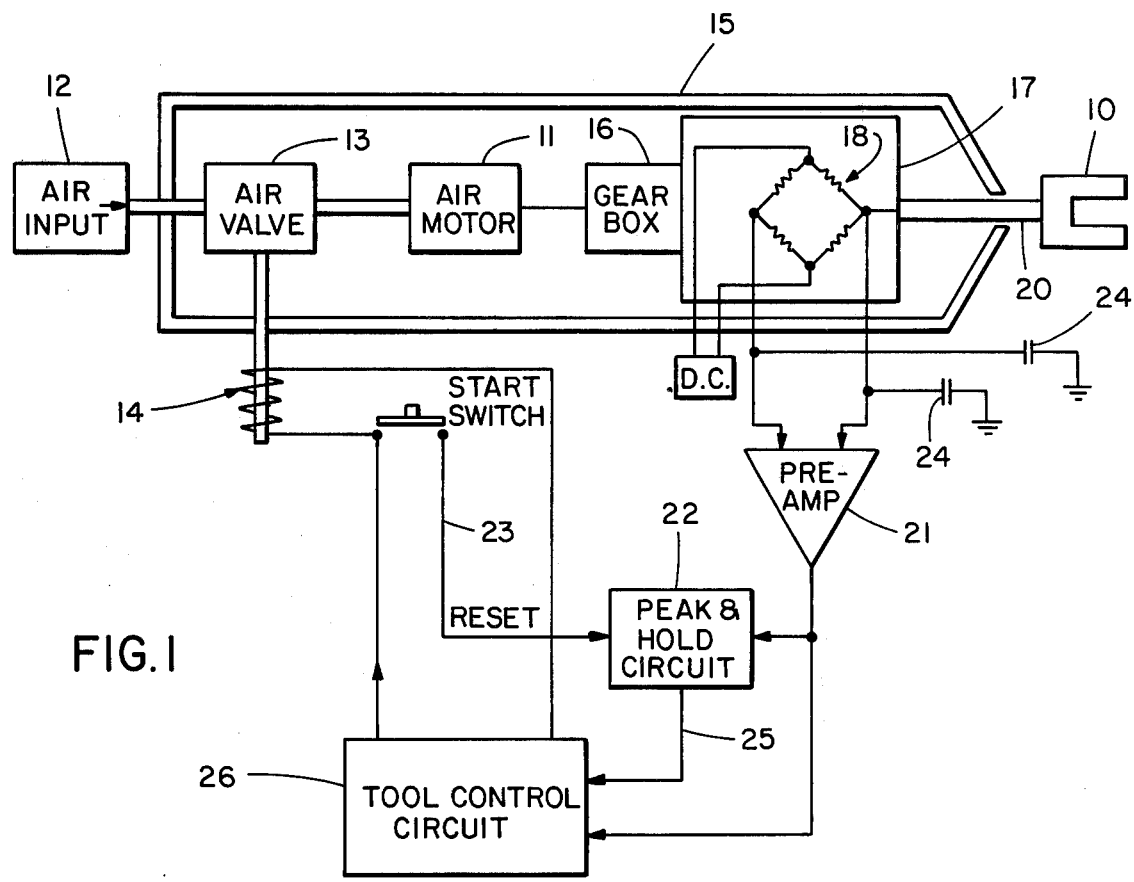
FIG. 1 is a schematic illustration of a torquing tool according to the invention illustrating in block form the control circuit therefor.

Referring to the drawings and in particular FIG. 1, an air powered nut setter is illustrated including a socket pin 10 which is driven by an air motor 11. The air motor 11 receives air from an air input supply 12 through a control valve 13. In the present instance valve 13 is controlled by an electric solenoid 14. The air motor 11 is connected to the socket 10 through a gear box 16. A transducer or strain gauge 17 measures the amount of torque applied by the socket 10. The air valve, motor, gear box and transducer are enclosed in a housing 15 while the socket 10 is attached to a shaft 20 which extends through one end of the housing.

The transducer 17 is a bridge circuit, including bridge 18, employing variable resistor strain gauges. The details of the transducer 17 are disclosed in U.S. patent application Ser. No. 418,762 filed Nov. 23, 1973, and are hereby incorporated by reference.

The output of the bridge circuit 18 consists of a varying DC voltage on the two output lines 19. The magnitude of the DC voltage is a function of the dynamic torque output of the tool. Capacitors 24 are provided to assure that the voltage across lines 19 represents the dynamic torque rather than start up torque when the tool is first turned on. The capacitors serve to remove voltage peaks which appear on start up.

The output from the bridge 18 is provided to a preamplifier 21, the output of which is fed to a peak and hold circuit 22 and to the tool control circuit 26. The peak and hold circuit is of known construction and operates to store the peak value of voltage from the preamplifier 21 until it is reset by line 23 at the beginning of each tool operation. The output of the peak and hold circuit, which is the peak voltage produced by the preamplifier 21 during a tool cycle, is provided to the tool control circuit via line 25.

The control circuit 26 receives the preamplifier signal and the peak and hold signal and in a manner now to be described repeatedly pulses the solenoid 14 to operate the tool in short bursts until the onset of yield is detected by the transducer 17. Since the onset of yield produces a signal pattern very similar to the initial run up, i.e., free run of the nut on a bolt, a torque threshold circuit is included to prevent tool shut down until at least a minimum torque has been detected by the bridge 18.

Figure 2:
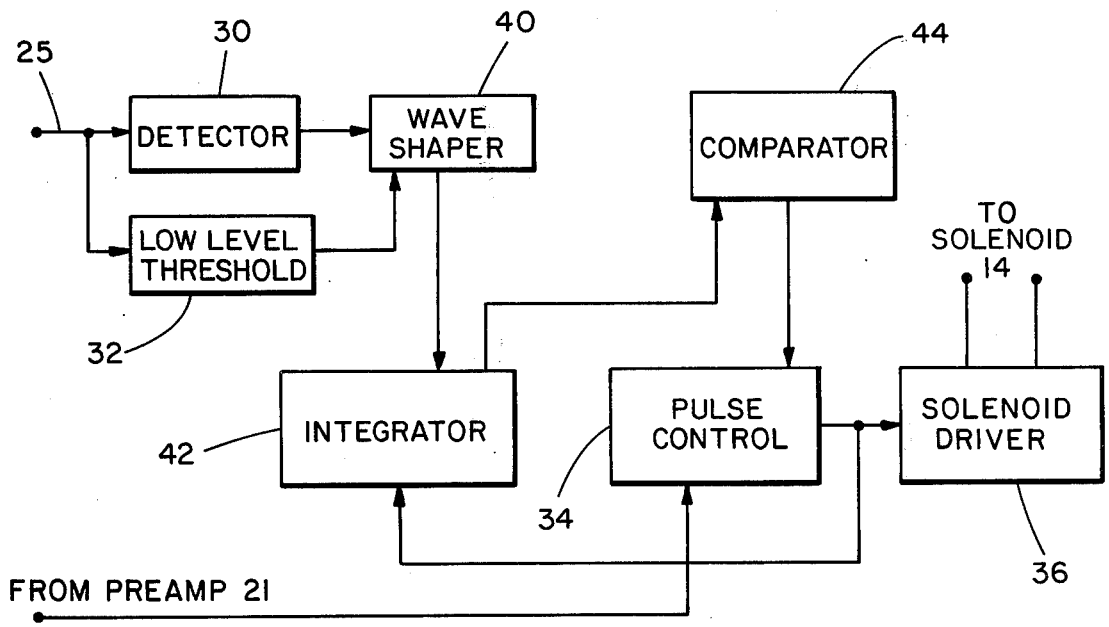
FIG. 2 is a block diagram of the control circuit of FIG. 1.

Referring now to FIG. 2, a detailed block diagram indicates the basic functions performed by the control circuit 26. The peak and hold signal is provided to a detector 30 and to a threshold circuit 32. The detector 30 detects a positive change in torque with respect to time. The threshold circuit 32 prevents premature shut down of the tool. The input from the preamplifier is provided to a pulsing circuit 34 which during the first stage of operation is effective for turning the tool on and off by controlling the solenoid driver circuit 36.

The outputs from detector 30 and threshold circuit 32 are provided to a wave shaping circuit 40 and then to an integrating circuit 42. Tool shut off is accomplished when the integrator reaches signal ground from an initial point which may be set as desired to select the point in the plastic region where shut off will occur. As long as an increase in torque is being detected, the fastener has not entered yield. Accordingly, the output from circuit 40 is utilized to reset the integrator 42 to maintain it at its initial value. When the plastic region is entered, torque will cease to build up (see FIG. 5) amd the integrator will no longer be reset by detector 30 through pulse wave shaper 40. The integrator 42 will then integrate from its preset value to zero. When the integrator reaches signal ground, an output is provided to a comparator circuit 44 effective for shutting off pulsing circuit 34.

The threshold, shaper, integrator and pulsing circuit blocks include adjustable resistance elements, i.e., potentiometers for setting the control circuit as desired. Thus, the low level threshold can be set to an appropriate value depending upon the tool characteristics and the type of fasteners being driven. The shaper block can be adjusted for proper operation and the integrator can be set to determine its initial point above signal ground. Having made these initial adjustments, the control circuit will then operate to pulse the tool to drive a nut onto a bolt until the onset of yield is detected. At that point, depending upon the setting of the integrator potentiometer, operation of the tool will set the nut to a desired torque point on the yield curve (see FIG. 5).

Referring to FIG. 3, a detailed schematic of the control circuit is illustrated. For ease of discussion the schematic is sectioned off by dashed lines to correspond with the block diagram of FIG. 2. Referring to the section comprising the detector 30 it will be seen that the peak and hold signal from peak and hold circuit 22 is applied to both inputs of an operational amplifier 50 through a pair of resistors 52 and 54. The plus input of amplifier 50 is connected through capacitor 56 to signal ground while the minus input of the amplifier is connected to the amplifier output by means of a feedback resistor 58.

Figure 5:
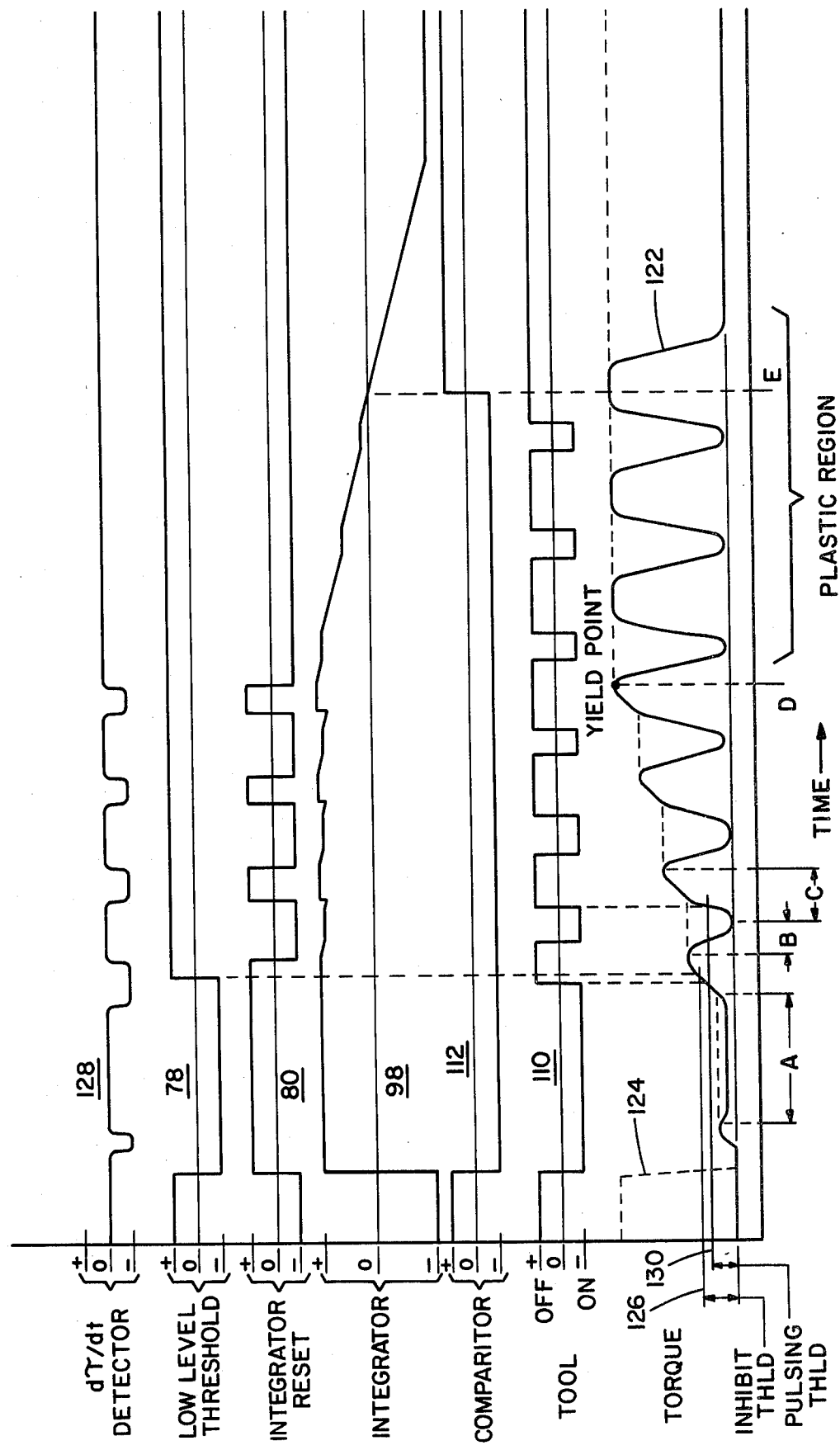
FIG. 5 is a wave form and timing diagram useful in understanding the circuit operation.

Due to the presence of capacitor 56 the positive input lags the negative input. This causes the output of the amplifier to go negative whenever the peak and hold signal is increasing. If the peak and hold signal is steady, the output of the amplifier is zero or some positive value equal to the peak and hold signal. Summarizing, when the peak and hold signal increases the output of the amplifier goes negative. When the peak and hold signal is constant the output of the amplifier is some positive value equal to the value of the peak and hold signal. FIG. 5, wave form 60, illustrates the output of amplifier 50.

Referring to FIG. 4, an alternate embodiment of the detector section 30 is illustrated. In the embodiment the resultant wave form produced by amplifier 50 is the same but the input connections are different. In this embodiment the peak and hold signal is fed to the negative input of the amplifier through a capacitor 62 while the positive input is connected to signal ground. A feedback resistor 54 is provided from the amplifier output to the negative input thereby forming a differentiator. This circuit segment will produce an output negative of ground only when there is a dynamic change in the applied peak and hold signal. That is, as the peak and hold signaling increases, the amplifier produces a negative output as shown in FIG. 5.

Referring again to FIG. 3, it will be seen that the peak and hold signal is also applied to the low level threshold circuit 32. This circuit includes an operational amplifier 66, the negative input of which is tied through a series of resistors including variable resistor 68 to a positive reference voltage. The peak and hold signal is applied to the plus input of the amplifier via resistor 70. As long as the applied peak and hold value is less than the reference voltage selected by resistor 68, the output of amplifier 66 is negative. When the peak and hold signal exceeds the reference voltage, the output of amplifier 66 goes positive (wave form 76, FIG. 5).

As indicated earlier, the purpose of the threshold circuit 32 is to prevent operation of the integrator circuit 42 during the initial run up of the nut onto the bolt. As may be seen by examining wave form 122 in FIG. 5, during initial run up a substantially flat torque characteristic is produced which characteristic is nearly identical with the characteristic indicating the onset of yield. The threshold inhibit circuit maintains the integrator circuit 42 in reset condition until sufficient torque has been detected to assure having passed initial run up. The torque value is selected by proper adjustment of potentiometer 68. When the peak and hold circuit exceeds the voltage value selected by potentiometer 68, the torque has exceeded the selected value and, therefore, the integrator can be allowed to operate in the intended manner.

The wave shaper circuit 40 receives the output from amplifiers 50 and 66 at its negative input. The presence of a negative signal from either amplifier will cause the output of amplifier 70 to go positive. This is effective for resetting the integrator circuit 42 in a manner to be described. Once the torque threshold has been exceeded, amplifier 66 goes positive and no longer affects operation of amplifier 74. Its operation is controlled solely by the output of amplifier 50.

The positive input to amplifier 74 is a negative voltage determined by the setting on variable resistor 78 which value is selected to provide a desired pulse shape and width for use by the remaining portion of the circuit. The output of amplifier 74 is illustrated as wave form 80 in FIG. 5. As can be seen by reference to that figure, until the inhibit threshold is exceeded, the output of amplifier 74 remains high. After the threshold is exceeded, the output of amplifier 74 follows the output of amplifier 50 going positive each time an increase in the peak and hold signal is detected and going negative when the peak and hold signal remains constant.

The output of amplifier 74 is applied to the integrator circuit 42. Integrator circuit 42 includes a field effect transistor 82 connected in feedback relation between the output and the negative input of an operational amplifier 84. Transistor 82 operates as a reset switch for the amplifier which is connected as an integrator. The point at which integration begins is determined by the setting on variable resistor 86 which selects a positive voltage value above signal ground. The integrator operates only while the tool is off during the pulsing period, which condition is detected by applying the output of the pulse generator circuit to the negative input of amplifier 84 via line 88 and diode 90. The output from amplifier 84 is taken on line 92 and applied to the comparator circuit 44.

Setting the variable resistor 86 selects the voltage value at which integration begins and also determines the rate of integration in accordance with the formula which follows. During operation the output of amplifier 84 decreases from its initial positive value towards a negative voltage level. When the value of amplifier 84's output on line 92 goes negative of system ground, comparator 44 generates a shut off signal and the operation of the tool stops.

As will be apparent from the circuit illustrated, two conditions must be present for the integrator to operate. First, the output of the amplifier 74 must be negative so that transistor 82 is cut off. (If the output of amplifier 74 is positive, transistor 82 is switched on resetting amplifier 84 to its initial value and inhibiting integration). Second, the output of the pulse generator circuit 34 must be positive indicating the tool is off.

The integrator will not integrate in the absence of a positive signal on line 88 due to the blocking action of diode 90. When a positive signal is detected, an approximate 0.5 volt drop across the diode occurs and feedback capacitor 94 begins to charge. This causes the negative input of amplifier 84 to go positive with respect to the plus input of the amplifier producing a negative output on line 92. Depending upon the value of capacitor 94 the voltage at the output on line 92 will decrease at a selected rate.

As known by those skilled in the art, the integration time of the operational amplifier circuit illustrated can be calculated as follows:

$$T = \frac{V_p \cdot R_{96} \times C_{94}}{V_o - (V_{d_+} \cdot V_p)}$$

where
$T$ = time in seconds
$V_p$ = potentiometer voltage
$R_{96}$ = value of resistor 96 in ohms
$C_{94}$ = value of capacitor 94 in farads
$V_o$ = output voltage of amplifier 104
$V_d$ = voltage drop across diode 90

Summarizing, the integrator is turned on during each off interval during tool operation, assuming the low level threshold has been exceeded. Each time the integrator is enabled it begins integrating towards a negative value and unless reset by the detection of an increasing peak and hold signal it will pass through signal ground. When the integrator is allowed to integrate through signal ground, comparator circuit 44 will shut off the tool. The output from the integrator amplifier 84 is illustrated as way form 98 in FIG. 5.

The output of the integrator on line 92 is fed to the negative input of operational amplifier 100. The positive input of this amplifier is referenced to signal ground. As long as the output of the integrating amplifier is positive with respect to signal ground, the output of amplifier 100 is negative and is blocked from the pulse generator circuit by diode 102. When the integrator goes negative with respect to signal ground, the output of amplifier 100 goes positive and is applied to the positive input of operational amplifier 104 via line 106.

The pulse generator circuit 34 receives the preamplifier signal from preamplifier 21 at its positive input as well as the signal from amplifier 100. The negative input of this amplifier is referenced to a selected positive voltage determined by the value of variable resistor 108. Until the output of amplifier 100 changes to positive, the plus input to amplifier 104 is a function of the preamplifier signal. As the tool develops torque on the fastener, the preamplifier signal increases. When it exceeds the value of the pulsing threshold determined by resistor 108, the output of amplifier 104 goes positive as illustrated by wave form 110 in FIG. 5. A positive output from this amplifier turns off the solenoid driver 36 stopping the tool. Torque continues to rise as indicated in FIG. 5 (wave form 122) due to the valve lag and tool momentum. After these effects have been dissipated, torque begins to fall and with it the preamplifier signal. When the preamplifier signal falls below the value of the pulsing threshold the output of amplifier 104 goes negative again operating the solenoid driver 36 which turns the tool back on. This cycle is repeated until the output from amplifier 100 goes positive overriding the operation of the pulsing circuit shutting the tool off. The output from amplifier 100 is illustrated in FIG. 5 as wave form 112. As indicated earlier, the output from amplifier 104 is fed back to the integrator section via line 88.

The output from the pulsing generator is applied to the solenoid driver circuit 36 which is an amplifier section including transistor 114 and Darlington amplifier pair 116 and 118. The solenoid driver is applied to the contacts of the solenoid 14 for operating air valve 13. If desired, a voltage doubling circuit including capacitor 120 and resistor 122 may be included for improving the reliability and performance of the air valve operation.

CIRCUIT OPERATION

Referring now to FIG. 5, the operation of the circuit can best be described by considering the outputs of the various sections with regard to graph of torque with respect to time. A typical wave form illustrating torque with respect to time is illustrated in FIG. 5 and bears the numeral 122. The illustrated wave form represents a typical operation of a nut runner applying a nut to a bolt and setting the nut a selected distance into the plastic region of the bolt.

A fastener tightening operation is initiated by the tool operator depressing switch 32. This generates a reset signal applied via line 23 to the peak and hold circuit 22. As indicated by the dashed lines, this causes the peak and hold signal 124 to fall to zero. As it falls below the inhibit value of the threshold circuit 32, the output of amplifier 66 changes to a negative value resetting the integrator and maintaining it at its initial value. In turn, this resets the comparator section 44 permitting the pulsing generator 34 to turn on the solenoid driver circuit for initiating tool operation. The tool begins to rotate the threaded fastener. As indicated on wave form 122 during the initial run up (segment A) there is little torque build up since the nut is free running on the threads. Since the torque value is below the inhibit threshold valve indicated by horizontal line 126, the integrator is maintained in its initialized condition.

As the tool begins to clamp the joint together, torque builds up causing an increase in the value of both the peak and hold and pre-amp signals. When the preamplifier signal exceeds the pulsing threshold, indicated by horizontal line 130, the tool shuts off due to a change in output from amplifier 104 (wave form 110). The tool continues to build up torque due to the tool momentum and system lag.

When the peak and hold value exceeds the inhibit threshold the output from amplifier 66 goes high permitting operation of the integrator. After the energy of the tool has been expended torque rapidly decreases (segment B). The output of the detector circuit returns to zero since torque is no longer increasing. This permits the integrator to start integrating towards system ground. As the pre-amp signal falls below the pulsing threshold, amplifier 104 turns the tool back on stopping integration but not resetting the integrator.

With the tool turned back on torque rapidly rises (segment C) and since the nut has not yet entered yield, an increase in the peak and hold value is detected by amplifier 50 which does reset the integrator amplifier 42. This process of turning the tool on and off continues through several cycles. In each case an increase in the peak and hold value resets the integrator to its initial value preventing it from reaching signal ground.

Finally, at point D the bolt reaches its elastic limit and enters yield. At this point torque no longer increases. Without an increase in torque the output of amplifier 50 remains positive and the integrator is not reset. Thus, during each off cycle of the tool it will integrate further down from its initial point until it reaches and goes negative of signal ground at point E. This causes the comparator 44 to disable the pulse generator 34 completing the operation.

Point E can be set at the onset of yield or at any point after the onset of yield as desired for a particular type of fastener and application.

The foregoing description relates to a system which is capable of detecting the onset of yield and of accurately, regardless of sample to sample variations in fastener strength, setting the nut at a torque value just inside the plastic region. Nevertheless, if desired, the system can be operated in a torque control mode similar to currently available systems. This is accomplished by setting the variable resistor 86 of the integrator to a very low value so that the integrator will reach signal ground on every off pulse of the tool. The shut off of the tool then can be controlled by the setting of the resistor 68 of the threshold inhibit circuit 32 for any selected torque value.

While I have shown and described embodiments for this invention in some detail, it will be understood that this description and illustrations are offered merely by way of example, and that the invention is to be limited in scope only by the appended claims.

I claim:

1. A control circuit for a torqueing tool, said tool including a torque measuring device, said circuit comprising:
    a. a peak and hold circuit producing a signal representative of the highest value of measured torque,
    b. means for operating said tool in a pulse mode in which the tool is turned on when the measured torque is below a selected threshold value and turned off when said torque is above said threshold value,
    c. means for integrating from an initial output value to a final value at a selected rate,
    d. means for detecting an increase in the peak and hold signal to reset said integrator means to said initial output value, and
    e. means comparing the output of said integrator means with a selectable comparator threshold for stopping said operating means.

2. The circuit according to claim 1 further including second means for resetting said integrator means when the peak and hold signal is below a selectable minimum value.

3. The circuit according to claim 1 wherein said operating means includes
    a. means for activating said tool and
    b. means for comparing the measured torque against said selected threshold value, said comparing means controlling said activating means.

4. The circuit according to claim 3 wherein said comparing means includes an operational amplifier receiving said measured torque signal and said threshold value as inputs and producing an output indicative of which of said inputs is of greater magnitude.

5. The circuit according to claim 3 wherein said means for activating is a solenoid driver circuit.

6. The circuit according to claim 1 wherein said integrating means includes
    a. means for selecting said initial output value and said selected rate of integration and
    b. means for resetting said integrator to said initial output value.

7. The circuit according to claim 6 wherein said integrating means includes an operational amplifier connected to perform integration, said resetting means including a semiconductor switch connected in the feedback path of said amplifier to reset said amplifier whenever said switch is operated.

8. The circuit according to claim 7 wherein said detecting means includes means for operating said switch when an increase in the peak and hold signal occurs.

9. The circuit according to claim 1 wherein said detecting means includes
    a. an operational amplifier having positive and negative inputs to which said peak and hold signal is applied and
    b. a capacitor connected between the positive input and ground so that the positive input lags the negative input producing a negative amplifier output whenever the peak and hold signal increases.

10. The circuit according to claim 9 wherein said detecting means further includes means for shaping said amplifier output and for applying the resultant signal to said integrating means.

11. The circuit according to claim 1 wherein said detecting means is an operational amplifier connected as a differentiator.

12. The circuit according to claim 11 wherein said detecting means further includes means for shaping said amplifier output and for applying the resultant signal to said integrating means.

13. The circuit according to claim 1 wherein said comparing means includes an operational amplifier and said selectable comparator threshold value is signal ground.

14. A control circuit for operating a rotary tool having an integral torque measuring device to tighten a nut onto a threaded shaft at least until said shaft reaches its yield point comprising:
   a. means for operating said tool in a pulse mode in which the tool is turned on when the measured torque is below a selected threshold value and turned off when said torque is above said threshold value,
   b. means for detecting the onset of yield in said shaft, and
   c. means responsive to said detecting means for disabling said operating means a selected time period after yield is detected to shut off said tool.

15. The circuit according to claim 14 wherein said detecting means includes:
   a. a peak and hold circuit producing a signal representative of the highest value of measured torque, and
   b. means for detecting a constant peak and hold signal indicative of the onset of yield.

16. The circuit according to claim 14 wherein said disabling means includes:
   a. means for integrating from an initial value to a final value at a selected rate when enabled by said detecting means, and
   b. means for comparing the output of said integrator means with a selectable threshold value for stopping said operating means.

17. A control circuit for a rotary tool having a torque sensing device for generating a torque signal representative of torque output, said circuit comprising:
   a. means for repetitively generating a selectable timing period,
   b. means for detecting when said torque signal remains substantially constant with respect to time,
   c. control means for initializing said time period generating means when said substantially constant signal is detected and for turning the tool off at the conclusion of said timing period.

18. A circuit in accordance with claim 17 wherein the means for generating a timing period includes an integrator which integrates from an initial value to a final value at a selected rate.

19. A control circuit for a rotary tool having a torque sensing device for generating a torque signal representing torque output, said circuit comprising: means for periodically starting the generation of a timing period, and control means responsive to a torque signal and to the timing period for turning off the tool when the torque output does not substantially increase over the duration of the timing period.

* * * * *